(No Model.) 2 Sheets—Sheet 1.
T. MARCOTTE.
LUMBER MEASURING MACHINE.
No. 484,555. Patented Oct. 18, 1892.
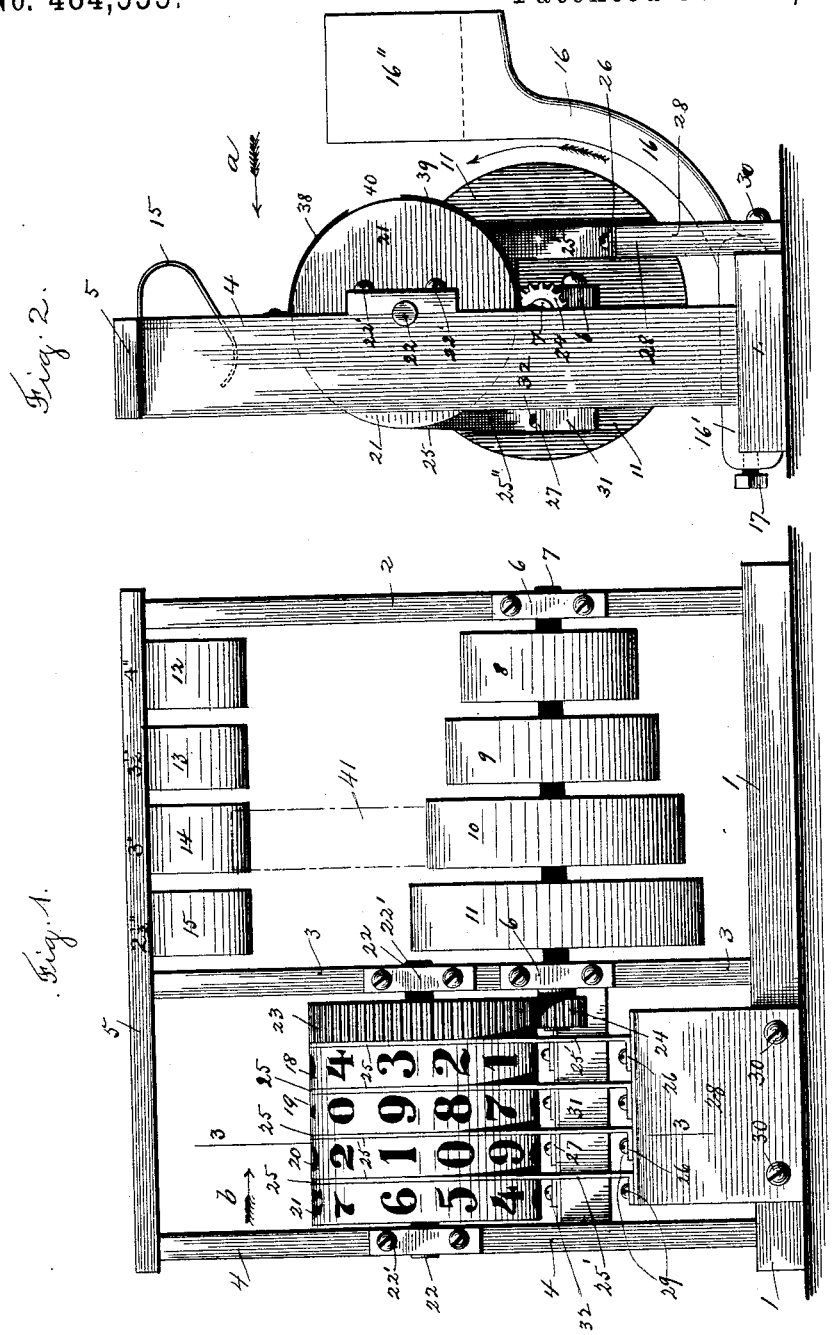
Witnesses
Chas. F. Schmelz
Katie Farrell
Inventor
Tellis Marcotte,
By his Attorney
John C. Dewey (No Model.) 2 Sheets—Sheet 2.
T. MARCOTTE.
LUMBER MEASURING MACHINE.

No. 484,555. Patented Oct. 18, 1892.

UNITED STATES PATENT OFFICE.

TELLIS MARCOTTE, OF WORCESTER, MASSACHUSETTS, ASSIGNOR OF ONE-HALF TO CHARLES W. CHAMBERLIN, OF SAME PLACE.

LUMBER-MEASURING MACHINE.

SPECIFICATION forming part of Letters Patent No. 484,555, dated October 18, 1892.

Application filed May 20, 1892. Serial No. 433,778. (No model.)

*To all whom it may concern:*

Be it known that I, TELLIS MARCOTTE, a subject of the Queen of Great Britain, residing at Worcester, in the county of Worcester and State of Massachusetts, have invented certain new and useful Improvements in Lumber-Measuring Machines; and I do hereby declare that the following is a full, clear, and exact description thereof, which, in connection with the drawings making a part of this specification, will enable others skilled in the art to which my invention belongs to make and use the same.

My invention relates to lumber-measuring machines, and more particularly to machines for measuring boards.

The object of my invention is to provide a simple and effective machine for automatically measuring the contents or the number of square feet in boards as they are passed through the machine, the contents of the boards or the number of square feet being automatically measured and registered by the machine, so that the same may be read off by the attendant without the necessity of any figuring or mental calculation and adding together of figures, &c.

My invention consists in certain novel features of construction and operation of a machine for measuring lumber or boards, as will be hereinafter fully described, and the nature thereof indicated by the claim.

Figure 3:
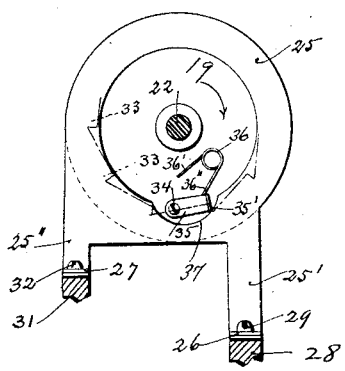
Figure 4:
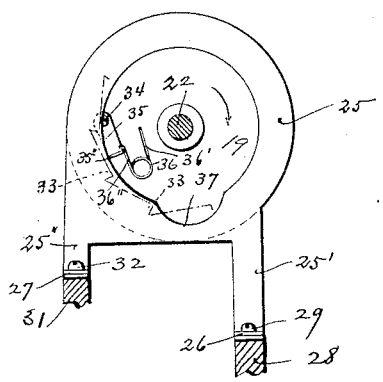
Figure 5:
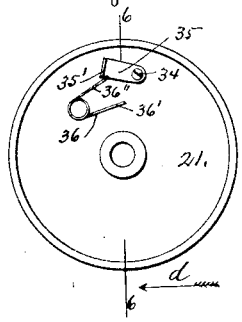
Figure 6:
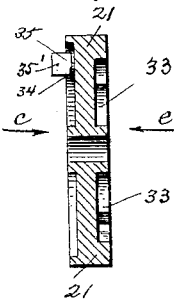
Figure 7:
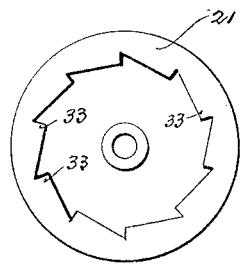

Referring to the drawings, Figure 1 is a front view of the measuring-machine, looking in the direction of arrow *a*, Fig. 2, with some of the parts left off for the sake of clearness. Fig. 2 is an end view, looking in the direction of arrow *b*, Fig. 1, showing some parts which are left off in Fig. 1. Fig. 3 is a vertical cross-section through the registering apparatus, taken on line 3 3, Fig. 1, looking in the direction of arrow *b*, same figure. Fig. 4 corresponds to Fig. 3, but shows a different position of the registering-wheel. Fig. 5 is a side view of one of the registering-wheels removed, looking in the direction of arrow *c*, Fig. 6. Fig. 6 is a vertical cross-section on line 6 6, Fig. 5, looking in the direction of arrow *d*, same figure; and Fig. 7 is a view of the opposite side of the registering-wheel shown in Fig. 5, looking in the direction of arrow *e*, Fig. 6.

My measuring-machine is designed more particularly to measure the number of square feet in inch-stock boards, which run from two and one-half to four inches wide, and which stock is ordinarily sold at so much a thousand square feet or more.

My machine is designed to automatically measure the number of square feet in boards of the class above referred to by means of a system of registering-wheels having numbers on the peripheries thereof. Said wheels are operated so as to automatically indicate the number of square feet in the boards passing through the machine, so that the same may be read off at a glance by the attendant. My measuring-machine may be adapted to measure any number of square feet, as desired, without readjusting the machine.

I have shown in the drawings a machine adapted to measure from one square foot to nine thousand nine hundred and ninety-nine square feet during one complete operation of the machine.

I will now describe the construction and operation of my measuring-machine.

In the accompanying drawings the frame of the machine consists in this instance of the base 1, the upright supports 2, 3, and 4, and the top bar 5. Between the supports 2 and 3 is mounted in suitable bearings 6 a shaft 7, on which are fast in this instance four wheels or pulleys 8, 9, 10, and 11. The dimensions of said pulleys vary, so that the measuring or registering apparatus will indicate accurately the number of square feet in boards which are two and a half, three, three and a half, or four inches wide. The boards are fed in edgewise over one of the pulleys 8, 9, 10, and 11, according to the width of the boards.

It will be readily seen that in the case of a board two and a half inches wide, which is passed over the pulley 11, it will take a greater length of board to revolve the pulley 11 once and to give a complete revolution to the shaft 7 than in the case of a board four inches wide, which is passed over the pulley 8. Above each of the pulleys 8, 9, 10, and 11 are arranged, in this instance, flat or leaf springs 12, 13, 14, and 15, one end of which is secured to the top rail 5 of the frame and the other free end of which extends in the path of the board passing over the pulley, so that it will bear on the upper edge of the board to hold the lower edge thereof on the face of the pulley and cause the friction of the board on the pulley as it is passed over the pulley and beneath the spring to cause said pulley and the shaft 7, on which it is fast, to revolve and operate the registering apparatus.

I prefer to combine with the pulleys 8, 9, 10, and 11 a supporting arm 16, (shown in Fig. 2,) the lower end 16′ of which is adapted to extend over the base 1 of the frame and be moved back and forth thereon to bring the upper end 16″ of the arm, which is slotted or grooved to hold the board edgewise, in front of one of the pulleys, according to the width of the board to be measured. The lower end 16′ of said arm 16 is secured to the base 1 of the frame by a set-screw 17. (See Fig. 2.)

I will now describe the registering apparatus, which indicates the number of square feet in the boards passing over any one of the pulleys 8, 9, 10, or 11. I have shown in the drawings four registering-wheels 18, 19, 20, and 21, provided with numerals on their peripheries, running from "0" to "9." The first wheel 18, in this instance, measures nine square feet of board, and the first two wheels 18 and 19 measure ninety-nine square feet of board, and the first three wheels 18, 19, and 20 measure nine hundred and ninety-nine square feet of board, and the four wheels 18, 19, 20, and 21 measure nine thousand nine hundred and ninety-nine square feet of board in one complete operation of the machine. The registering-wheels 18, 19, 20, and 21 are mounted loosely on a shaft 22, supported in bearings 22′ on the upright supports 3 and 4, and on said shaft 22 is fast a gear 23, which meshes with and is driven by a pinion 24, fast on shaft 7. Interposed between the gear 23 and the first registering-wheel 18 is a stationary cam-plate 25, preferably provided with downwardly-extending legs 25′ and 25″, which are provided with feet 26 and 27. The foot 26 is in this instance rigidly secured to the top of the stand 28 by a screw 29. The lower end of the stand 28 is secured to the front edge of the base 1 by screws 30. The foot 27 of the rear leg 25″ of the plate 25 is in this instance secured to the top of the cross-bar 31 by a screw 32. The cross-bar 31 is secured to the rear of the two upright supports 3 and 4. Interposed between the registering-wheels 18 and 19, 19 and 20, 20 and 21, are stationary cam-plate 25, corresponding to the stationary cam-plates 25 interposed between the gear 23 and registering-wheel 18, above described.

The registering-wheels 18, 19, 20, and 21 are each of the same construction and have on one side internal ratchet-teeth 33 formed thereon, (see Figs. 6 and 7,) and on the opposite side of the wheel, which is recessed, as shown in Figs. 5 and 6, is secured by a screw 34 a spring-actuated pawl 35, having an outwardly-extending lip 35′ on the free end thereof, which is adapted to extend beyond the edge or side of the wheel, as shown in Fig. 6, so as to engage with the ratchet-teeth 33 on the adjoining wheel, as indicated in Figs. 3 and 4. One end 36′ of the coil-spring 36, which actuates the pawl 35, is secured to the registering-wheel, and the other end 36″ engages the free end of the pawl 35, as shown in Fig. 5, to push said pawl outwardly and allow the lip 35′ thereof to catch over and engage one of the ratchet-teeth 33 on the adjoining wheel, as shown in Fig. 3, when the wheel carrying the pawl passes the cam portion 37 of the plate 25. As the registering-wheel carrying the pawl 35 passes the regular surface of the plate 25 the lip 35′ of the pawl 35 rides on the edge thereof, as shown in Fig. 4, and is forced inwardly against the action of the spring 36 and held out of engagement with the ratchet-teeth 33 on the adjoining wheel.

It will be understood that the gear-wheel 23 on the side next to the registering-wheel 18 is provided with a pawl 35 and actuating-spring 36, corresponding to the pawl and spring on the registering-wheels shown in Figs. 3 to 6, inclusive, and above described, which pawl engages with the ratchet-teeth 33 on the side of the registering-wheel 18, next to the gear 23 when said pawl is not held out of engagement with said ratchet-teeth by the plate 25, interposed between the gear 23 and wheel 18.

Extending over the upper and lower portion of the registering-wheels are two plates or curved surfaces 38 and 39, (see Fig. 2,) which are attached to the upright supports 3 and 4. An open space or slot 40 is left between the edges of the plates 38 and 39 of a width corresponding to the size of the numerals on the registering-wheels. The object of the slot 40 is to readily read the numerals presented to view in the slot as the machine operates.

The plates 38 and 39 are not shown in Fig. 1, for the sake of clearness.

The operation of my measuring-machine will be readily understood from the above description in connection with the drawings, and is as follows: The registering-wheels 18, 19, 20, and 21 are preferably first moved around so that the zero-point on each wheel will all be in a line and presented at the opening or slot 40, between the plates 38 and 39. The revolution of the shaft 7, caused by the passing of a board, as 41, (indicated by dotted lines, Fig. 1,) over one of the pulleys, as 10, fast thereon, will cause the pinion 24, fast on said shaft 7, to drive the gear 23, fast on the shaft 22. As said gear revolves the pawl 35 thereon is carried around with said gear, and the lip 35′ on said pawl is held out of engagement with the ratchet-teeth 33 on the wheel 18 by the plate 25, interposed between said gear and wheel, until in the revolution of the gear 23 the pawl 35 reaches the cam portion 37, in this instance in the lower part of the plate 25, when the spring 36 will act to force outwardly the free end of the pawl 35 and cause the lip 35' thereon to catch onto one of the ratchet-teeth 33 on the wheel 18 and turn said wheel 18 one-tenth of a revolution, corresponding to one division marked on the edge of the wheel and register one square foot. The continued revolution of the gear 23 causes the free end 35' of the pawl to ride upon the regular surface of the plate 25 and be disengaged from the ratchet-teeth 33 on said wheel 18 and allows the wheel 18 to remain at rest until another complete revolution of the gear 23, when the pawl 35 will again operate to give another tenth part of a revolution to the wheel 18 and cause the next numeral to appear, indicating the number of square feet then measured. It will be seen that it will take ten complete revolutions of the gear 23 to give one complete revolution to the registering-wheel 18 and register nine square feet measured. At each partial revolution of the wheel 18 the pawl 35 thereon is carried around with said wheel, but is held out of engagement with the teeth 33 on the adjoining wheel 19 by the plate 25 until the pawl reaches the cam portion 37 in said plate, which will be in practice at the end of a complete revolution of the wheel 18. The continued revolution of the wheel 18 will bring the zero-point thereon into view, and will at the same time cause the lip 35' of pawl 35 on said wheel 18 to engage with the ratchet-teeth 33 on the adjoining registering-wheel 19 and give to said wheel 19 a tenth revolution. Said wheel starting at the zero-point will thus register "1" and the wheel 18 "0," showing that ten square feet have been measured. The wheel 19 now remains at rest until another complete revolution of the wheel 18, when it is moved another one-tenth revolution to bring another division-mark thereon, as "2," into view and register with wheel 18 the number "20." After the wheel 19, operated by the wheel 18, as above described, has had one complete revolution the pawl 35 on said wheel 19 will engage the ratchet-teeth on the adjoining wheel 20 and give one-tenth revolution to said wheel 20 and bring the division "1" thereon into view. The three wheels 18, 19, and 20 will then register one hundred square feet. The three wheels 18, 19, and 20 will now be operated until the fourth wheel 21 is made to revolve, and when by the continued revolutions of the four wheels 18, 19, 20, and 21 a complete revolution has been given to the wheel 21 and there has been one complete operation of the machine the registering apparatus will register nine thousand nine hundred and ninety-nine square feet. The continued operation of the machine will bring the zero-points on the registering-wheels into view, and the operation of the wheels will be repeated to measure and register the number of square feet in the boards without any readjusting or resetting of the machine or of the registering apparatus.

It will be understood that more than four registering-wheels may be employed, if desired, or less than four, according to the size of the machine.

The relative size of the pulleys 8, 9, 10, and 11 and of the pinion 24 and gear 23 must be properly calculated at the time of building the machine, so that the operation of the registering-wheels will be accurate to measure and register the number of square feet in the boards passing through the machine.

It will be understood that the details of construction of the several parts of my machine may be varied somewhat, if desired, from what is shown and described, and the same may be adapted for other measuring purposes, if desired.

Having thus described my invention, what I claim as new, and desire to secure by Letters Patent, is—

In a measuring-machine adapted to measure the number of square feet in boards of different widths without adjusting or altering the machine, the combination, with a plurality of pulleys over and in contact with the face of which the boards to be measured are passed, a shaft on which said pulleys are fast, and a second shaft geared to the first-mentioned shaft and having a gear fast thereon and having a plurality of registering-wheels loosely mounted on said shaft, one of said wheels connected with and driven by said gear, of said registering-wheels provided with numerals on their peripheries and having ratchet-teeth on one side thereof and a spring-actuated pawl on the other side thereof, and a stationary cam-plate interposed between the ratchet-teeth side and pawl-carrying side of contiguous registering-wheels and adapted to hold the pawl on one wheel out of engagement with the ratchet-teeth on the next wheel and provided with a cam portion to allow the pawl to engage the ratchet-teeth and move the registering-wheel at the proper time for the purpose stated, substantially as set forth.

TELLIS MARCOTTE.

Witnesses:
JOHN C. DEWEY,
KATIE FARRELL.